US005202535A

United States Patent [19]

Dauwen et al.

[11] Patent Number: 5,202,535

[45] Date of Patent: Apr. 13, 1993

[54] CHIRAL ABSORBER

[75] Inventors: Jan M. A. Dauwen, Bekkevoort; August T. Timmerman, Westerlo; Michel A. C. Van Craenendonck, Mol; Hugo F. Pues, Keerbergen, all of Belgium

[73] Assignee: Grace N.V., Westerlo, Belgium

[21] Appl. No.: 866,598

[22] Filed: Apr. 10, 1992

[30] Foreign Application Priority Data

Jun. 28, 1991 [GB] United Kingdom ................. 9113993

[51] Int. Cl.[5] ................................................ B32B 9/00

[52] U.S. Cl. ..................................... 174/35 R; 342/1; 343/703

[58] Field of Search ............... 174/35; 342/1; 343/703

[56] References Cited

U.S. PATENT DOCUMENTS

| | | | |
|---|---|---|---|
| 2,841,736 | 7/1958 | Dicke | 313/273 |
| 4,948,922 | 8/1990 | Varadan et al. | 174/35 |
| 5,063,391 | 11/1991 | Jaggard et al. | 343/703 |
| 5,099,242 | 3/1992 | Jaggard et al. | 342/1 |

FOREIGN PATENT DOCUMENTS

90/04210 4/1990 PCT Int'l Appl. .

OTHER PUBLICATIONS

"Chiro Shield: A Salisbury/Pallenbach Shield Alternative," *Electronics Letter;* Aug. 16, 1990, vol. 26, No. 17, pp. 1332–1333.

Varadan et al, "On the Possibility of Designing Antireflection Coatings Using Chiral Composites", Jor. of Wave Material Interaction, vol. 2, No. 1, Jan. 1987.

D. L. Jaggard et al, Applied Physics, 18, 211, 1979.

Tinoco et al., "The Optical Activity of Oriented Helices," J. Phys. Chem., 61, 1196 (1957).

A. Lakhtakia et al., "A Parametric Study of Micro Reflection Characteristics of a Planar Achiral-Interface", IEEE Transactions on Electromagnetic Compatability, vol. EMC-28, No. 2 (May, 1986).

A. Lakhtakia et al., "Scattering and Absorption Characteristics of Lossy Dielectric, Chiral, Non-Spherical Objects," Applied Optics, vol. 24, No. 23 Dec. 1, 1985.

S. Bassiri et al., Alta Frequenza, 2, 83, 1986.

M. Ali Omar, Elementary Solid State Physics, pp. 163-166: 389-394 (1975).

*Primary Examiner*—Patrick J. Ryan
*Assistant Examiner*—Cathy Lee
*Attorney, Agent, or Firm*—John Dana Hubbard; William L. Baker

[57] ABSTRACT

An absorbing assembly for absorbing electromagnetic radiation in the range 10 MHz to 100 GHz comprises a lossy dielectric material and chiral elements disposed outside the lossy dielectric. The chiral elements may be springs, moebius bands, irregular tetrahedra, tapering helical springs, screws or handed non-planar forks.

17 Claims, 8 Drawing Sheets

CHIRAL ABSORBER

FIELD OF THE INVENTION

This invention relates to a chiral absorbing structure, in particular for use in absorbing electromagnetic radiation in the frequency range of 10 megahertz to 100 gigahertz. These are of great importance in providing anti-reflection materials.

BACKGROUND OF THE INVENTION

Until the discovery of chiral activity, the development of electromagnetic radiation absorbing materials was limited to design variations in $\epsilon_r$, (relative permittivity), and $\mu_r$, (relative permeability) of the absorbing material. In order to match the impedance of the absorbing material to the free space impedance $\epsilon$ and $\mu$ are ideally equal. Practical considerations, however, dictate that this is not possible, with the result that the development of absorbers had been confined to searching for compromise combinations of $\epsilon_r$ and $\mu_r$ for the abosorbing material which produce the best results. There were therefore 2 degrees of freedom in choosing the properties of the absorber.

The introduction of chirality into an absorber produces an extra degree of freedom, expressed by the chirality parameter $\beta$, for the choice of properties of the abosrbing material.

Chirality is the handedness of an object, that is, the property of an object which renders it non-congruent with its mirror image. Work carried out on chiral absorbing materials indicates that electromagnetic radiation incident on an absorbing material containing chiral inclusions is caused to decompose into left-and right-circularly polarised forms and be scattered through the lossy dielectric material which is host to the chiral inclusions.

SUMMARY OF THE INVENTION

According to the present invention there is provided an electromagnetic radiation absorbing structure comprising a structure for absorbing electromagnetic radiation in the range of frequencies 10 megahertz to 100 gigahertz comprising:

a lossy dielectric medium; and chiral elements disposed outside the lossy dielectric medium.

The teaching of the prior art is that chirality is only effective when in a lossy host. Tests conducted on chiral elements alone show no absorptive properties. With the structure of the present invention, it has been found that enhanced absorption can be achieved by the addition of chiral elements to the exterior surface of a lossy dielectric material, that is, the chiral elements do not have to be embedded within a lossy dielectric host, but rather may be adjacent it while still enhancing the absorption properties of the overall structure.

The present invention has a number of advantages. One of these is that the manufacture of the overall structure is particularly simple as compared with the absorbers of the "included" type. The control of the dispersion or distribution of chiral elements is particularly easy to achieve as compared with the prior art, in which the distribution of elements is subject to the vagaries of mixing. A second advantage is that where the lossiness of the lossy dielectric is adjusted, or produced by addition e.g. by the steeping of a foam in a suspension or solution of carbon black, the absence of the chiral elements during manufacture is especially advantageous. Generally, the absorption of the lossy dielectric is adjusted by squeezing the foam in order to limit the quantity of carbon black in the foam to the desired quantity before drying. Such a process would not be possible in the presence of chiral elements within the foam.

With the present invention, the chiral elements do not have to be in the lossy part of the absorbing structure, but rather in a non-lossy part, i.e. on the surface of the lossy material and in free space, or embedded in a non-lossy matrix which is adjacent the lossy material. The use of chiral elements in a non-lossy foam for example allows the modular construction of absorbing structures allowing different combinations of $\beta$, $\epsilon_r$ and $\mu_r$ to be produced without committing materials to a combination of all three in a single structure. For the purposes of the present invention, the terms "low loss" and "non-lossy" are intended to refer to a material which has a loss tangent tan $\delta$ of less than 0.1. The term lossy, in the present context, is intended to refer to a material with a loss tangent tan $\delta$ of greater than 0.1.

In the present context it is preferable, but not essential that the loss tangent and dielectric constant of the low loss host material are less than 0.01 and 1.25 respectively. In the case of the lossy materials, the loss tangent and dielectric constant are preferably greater than 0.85 and 2.6 respectively at 10 gigahertz. The dielectric constant of the low loss materials may approach such a high value as 1.5 in cases where the material considerations are not purely on the basis of electromagnetic radiation absorption, for example mechanical requirements may dictate that high density foams be used, rather than low density foams. Such high density foams naturally have somewhat higher dielectric constants, and therefore for the same loss tangent, a somewhat higher imaginary dielectric constant component and increased insertion loss. It is regarded that such a component is nevertheless so small as to be insignificant and its effect be unmeasurable.

The present invention is concerned with the production of absorbing structures in the range 10 MHz to 100 GHz; it should be borne in mind that the properties of materials such as lossy dielectrics, in particular the loss tangent and dielectric constant are frequency dependent to the extent that a material or structure whether according to the present invention or not, which exhibits high reflection attenuation one frequency within the range, may in fact exhibit strong reflections at other frequencies, especially surface reflection due to the severity of the discontinuity of properties such as permittivity.

It should therefore not be expected that a particular absorbing structure according to the invention will work over the full range claimed, but rather that the present invention provides an instruction for the production of an improved absorber whose properties will be apparent only in parts of the range particular to that absorber. Absorption elsewhere in the range will be exhibited with different combinations of properties.

IN THE DRAWINGS

The invention will further be understood from the following description when taken together with the attached drawings which are given by way of example only and in which.

DETAILED DESCRIPTION

Figure 1:
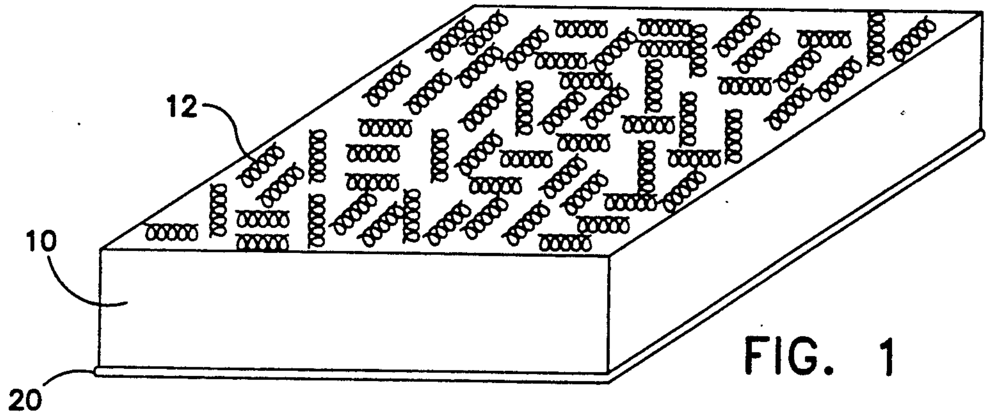
FIG. 1 shows a first embodiment of the invention.

FIG. 1 shows an embodiment of the invention in which chiral elements 12, in this case, metallic helical springs are superposed on a lossy dielectric material 10 the structure is shown in position over a reflective surface 20, such as a metallic sheet.

Figure 2:
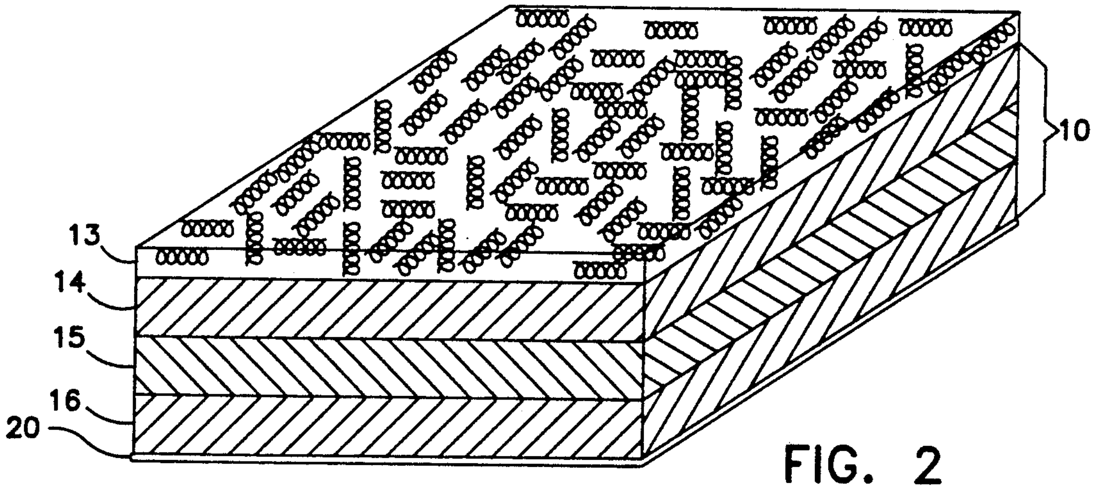
FIG. 2 shows a second embodiment of the invention.

FIG. 2 shows an alternative embodiment of the invention in which the chiral elements are embedded in a non-lossy foam 13. This foam layer is then superposed on the lossy dielectric medium 10, which in this case comprises a dielectric of increasing permittivity through its depth. This is produced in this instance by the superposition of the layers 14, 15 and 16 of absorbing material of successively increased loss tangent and dielectric constant.

In the embodiments shown, the lossy dielectric medium may be, for instance, from the ECCOSORB LS (T.M.) series produced by Emerson & Cuming. An example of a multi-layer lossy foam is ECCOSORB AN (T.M.), with increased loss tangent and dielectric constant through its depth. The chiral elements may be embedded in a non-lossy foam such as ECCOFOAM FPH (T.M.) which has a dielectric constant of 1.1 and a loss tangent of the order of $10^{-4}$. The non-lossy foam is equally applicable tot he embodiment of FIG. 1, as is the progressively lossy dielectric assembly shown in FIG. 2.

Helices which may be used as chiral elements in the absorber are given, by way of non-limitative example only, in the table below:

| HELIX | WIRE DIAMETER (mm) | COIL DIAMETER (mm) | PITCH | LENGTH (mm) |
|---|---|---|---|---|
| 1 | 0.2 | 1.0 | 0.32 | 2.0 |
| 2 | 0.25 | 1.2 | 0.36 | 2.4 |
| 3 | 0.32 | 1.6 | 0.51 | 6.3 |
| 4 | 0.32 | 2.0 | 0.63 | 5.3 |
| 5 | 0.32 | 2.5 | 0.78 | 4.7 |

Figure 3:
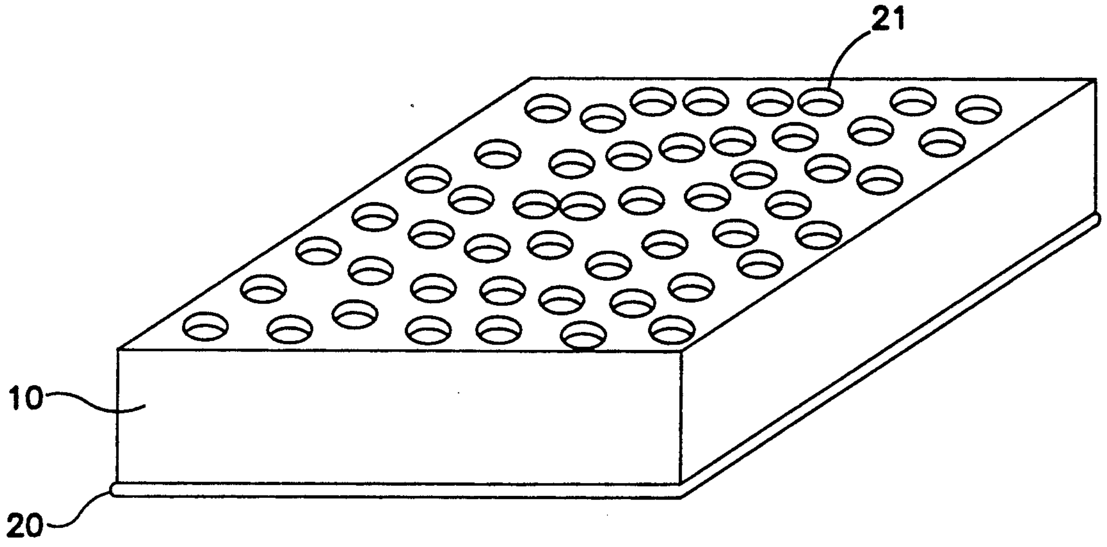
FIG. 3 shows a third embodiment of the invention.

FIG. 3 shows a third embodiment of the invention in which the chiral elements are Möbius bands 21 which are superposed on the lossy dielectric material 10.

Figure 4:
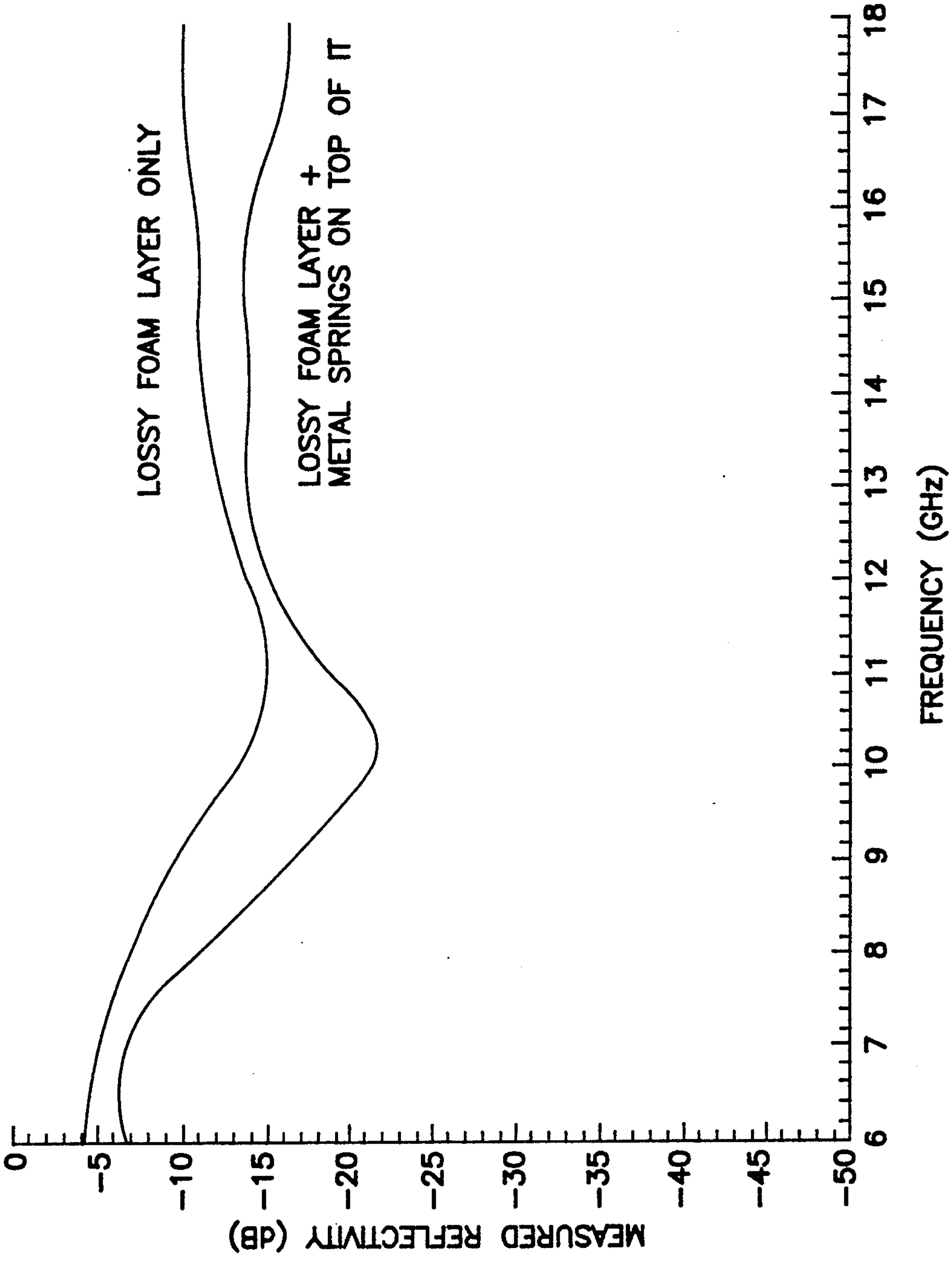
FIGS. 4-9 show results obtained from absorbing structures made according to the invention.
Figure 5:
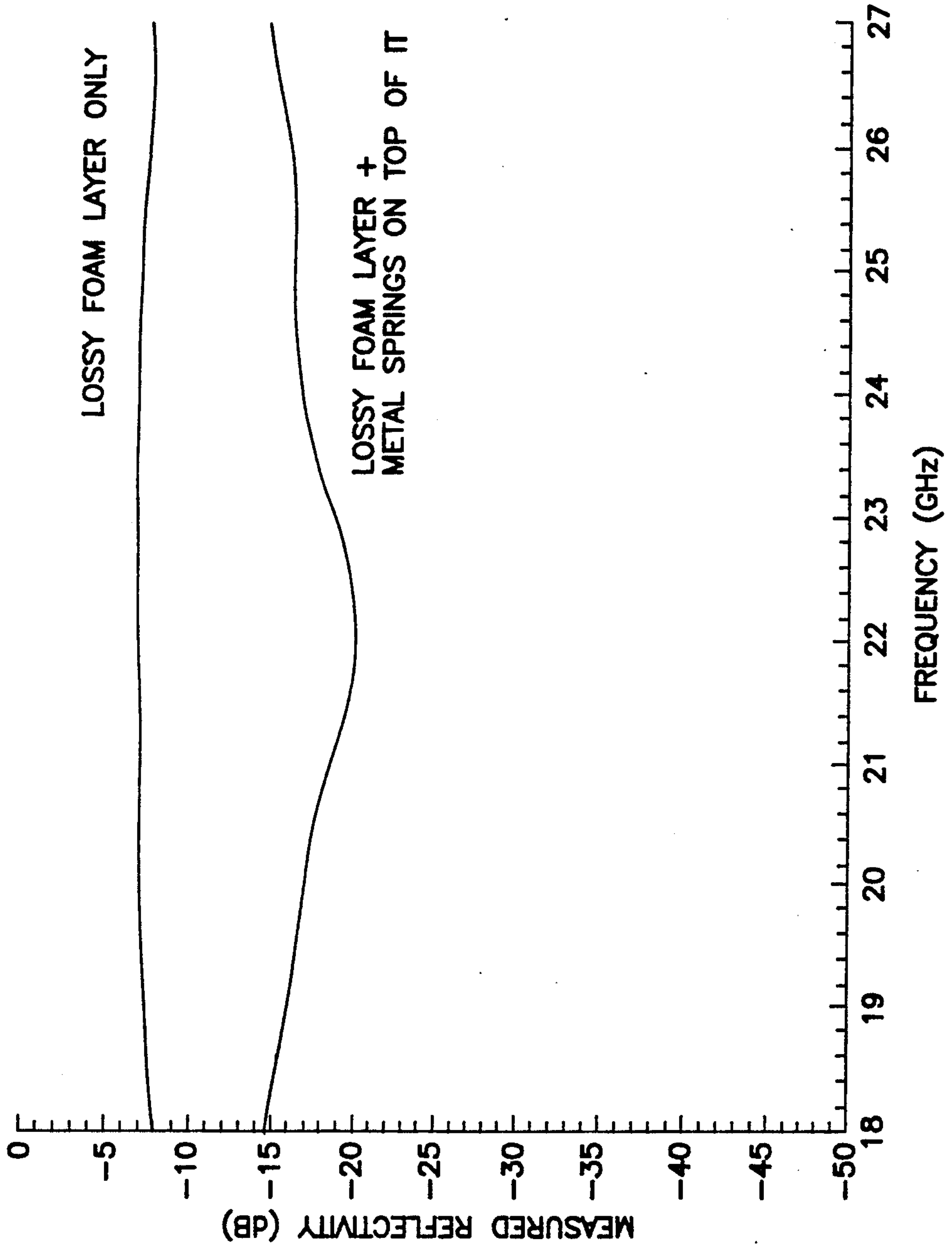

FIGS. 4 and 5 show test results obtained with an absorbing structure according to the invention. The lossy dielectric used was one of the ECCOSORB LS (T.M.) range discussed above with an insertion loss of 7.5 dB at 3 gigahertz. The chiral elements used were metallic springs of the following typical dimensions: overall length 4.7 mm; wire diameter 0.32 mm; coil diameter 2.5 mm; pitch 0.78 mm. Such springs are available from TEVEMA under the specification D 10700. The tests were carried out on a 25 cm square test piece with a surface density of springs corresponding to 4 $cm^3$ of the metal distributed homogeneously over the test piece. As can be seen, the insertion loss of the overall structure is markedly increased as compared with the lossy foam layer alone, an increase in insertion loss of up to 12 dB being achieved.

Figure 6:
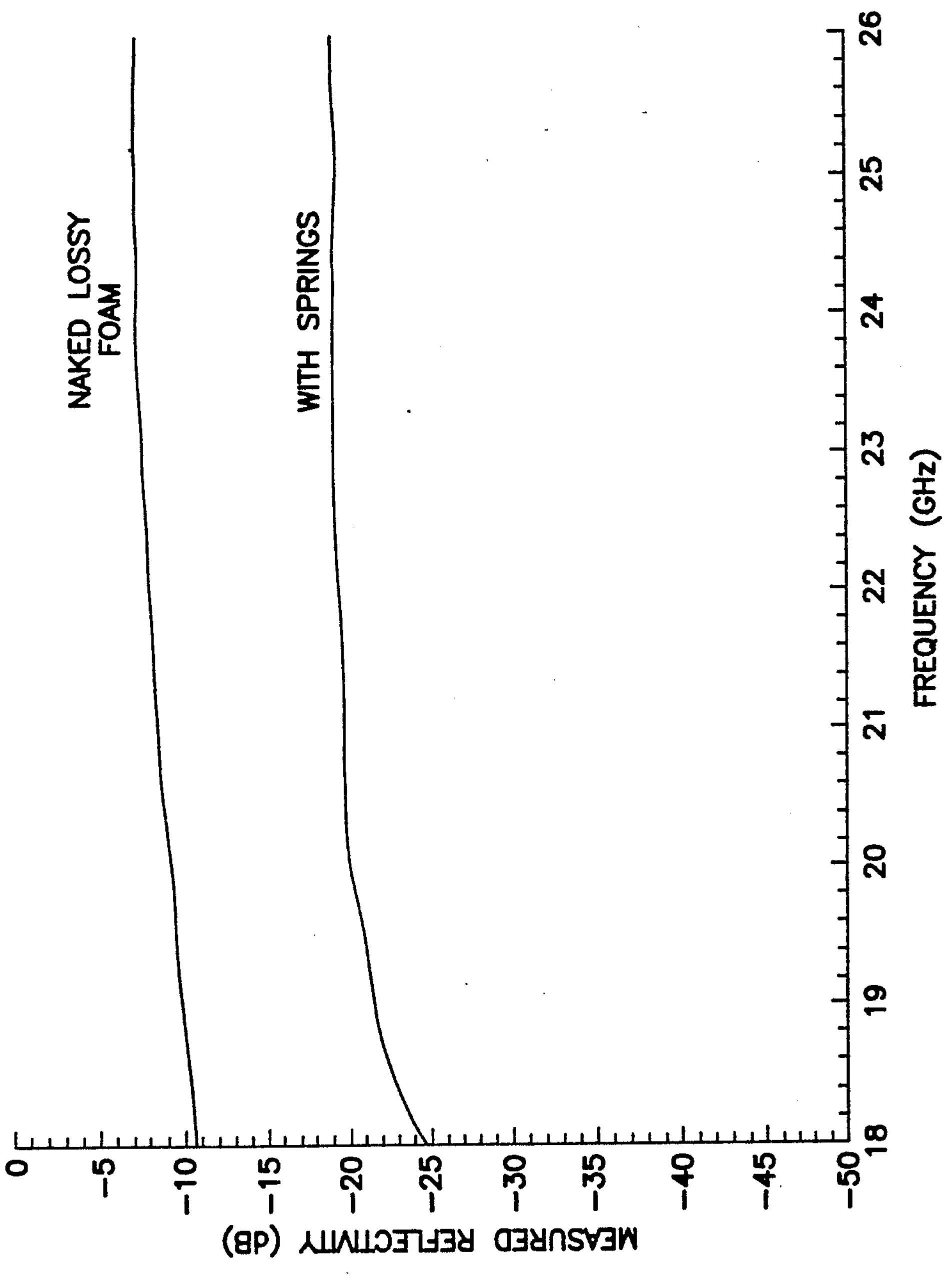

FIG. 6 shows a similar test carried out with a lossy dielectric foam of insertion loss 6.2 dB at 3 gigahertz and metallic springs of the D 10610 specification (TEVEMA). With approximately 1000 chiral elements on the 25 cm square test piece an increase in insertion loss of between 10 and 14 dB can be noted.

Figure 7:
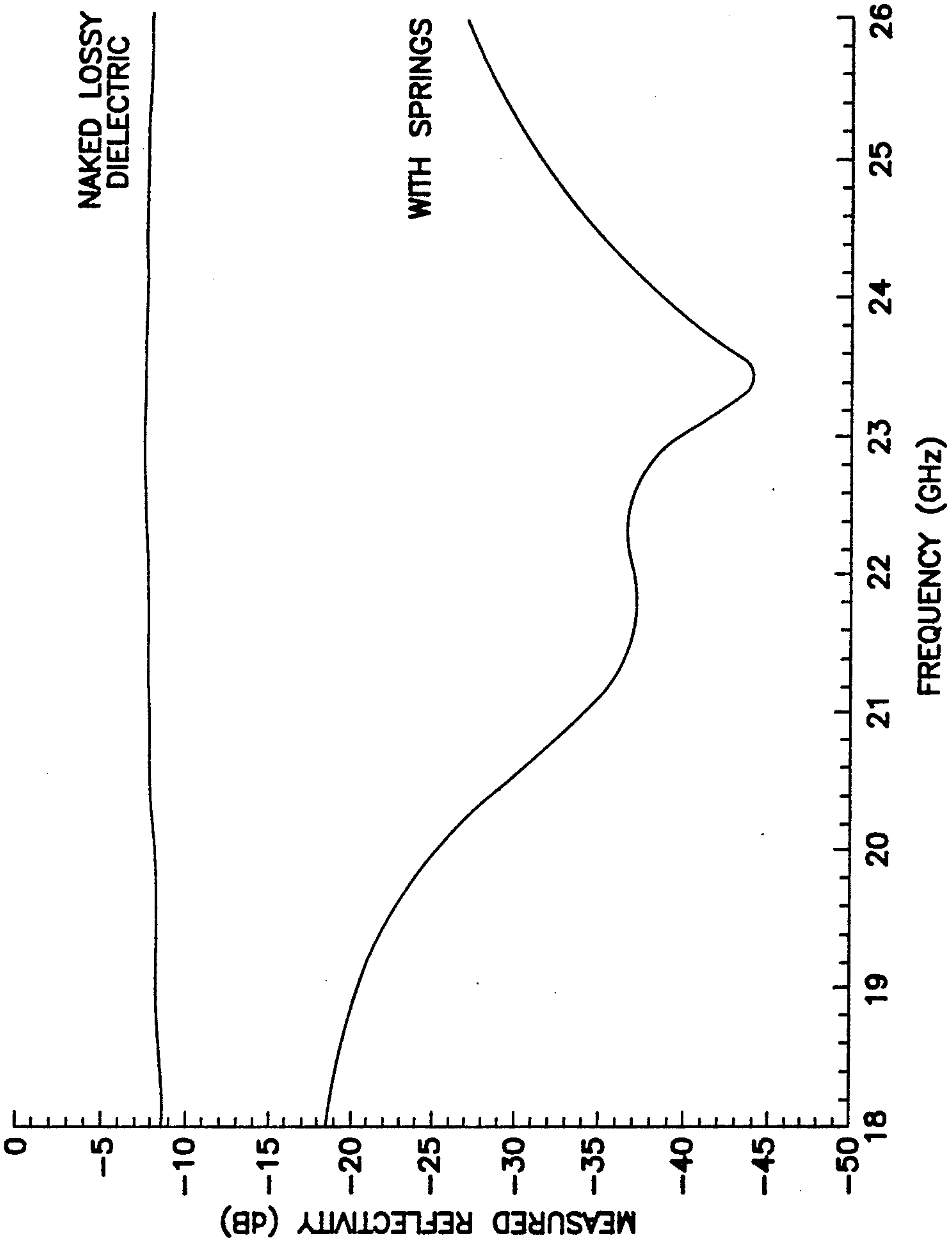

FIG. 7 shows the results of a test similar to that carried out above but with a lossy dielectric of approximately 5.7 dB insertion loss at 3 gigahertz and with 1450 springs of the D 10700 specification spread on the 25 $cm^2$ test piece. As can be seen, the insertion loss can be improved by up to 35 dB by the addition of the chiral elements.

Figure 8:
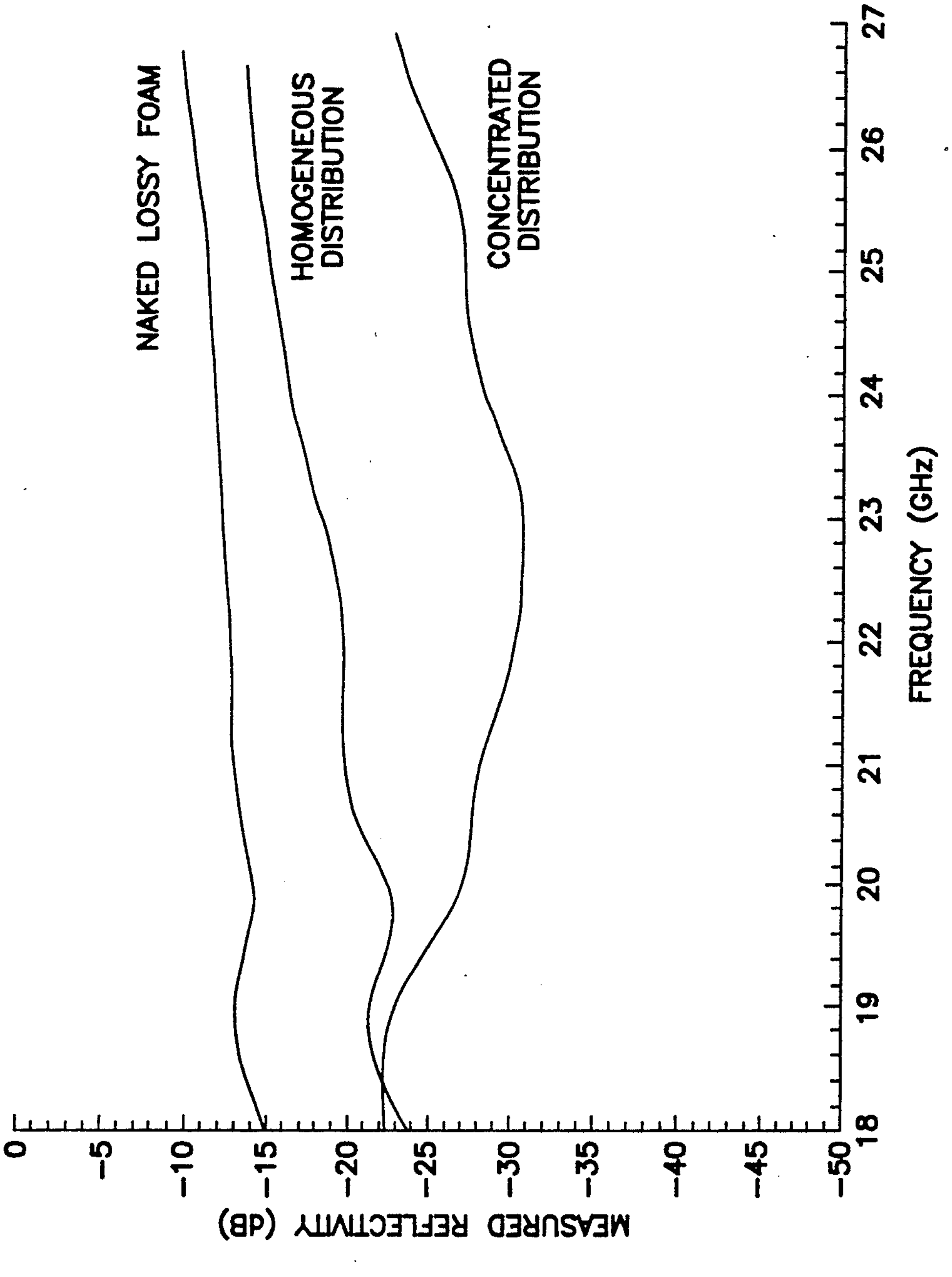

FIG. 8 shows the results of a similar test with a lossy dielectric of insertion loss 7.3 dB at 3 gigahertz and chiral elements of the D 10610 specification (TEVEMA). The results are shown for instances where the helices are homogeneously distributed (the middle of the three curves) and where the helices are concentrated towards the centre of the test sample (the lower of the three curves). As can be seen, an improvement in reflection attenuation of up to 15 dB is possible.

In the range 2-27 GHz it has been found that a concentration of springs corresponding to between $6\times10^{-3}$ and $10\times10^{-3}$ $cm^3$ of metal per $cm^2$ of surface is preferable, but not essential.

Figure 9:
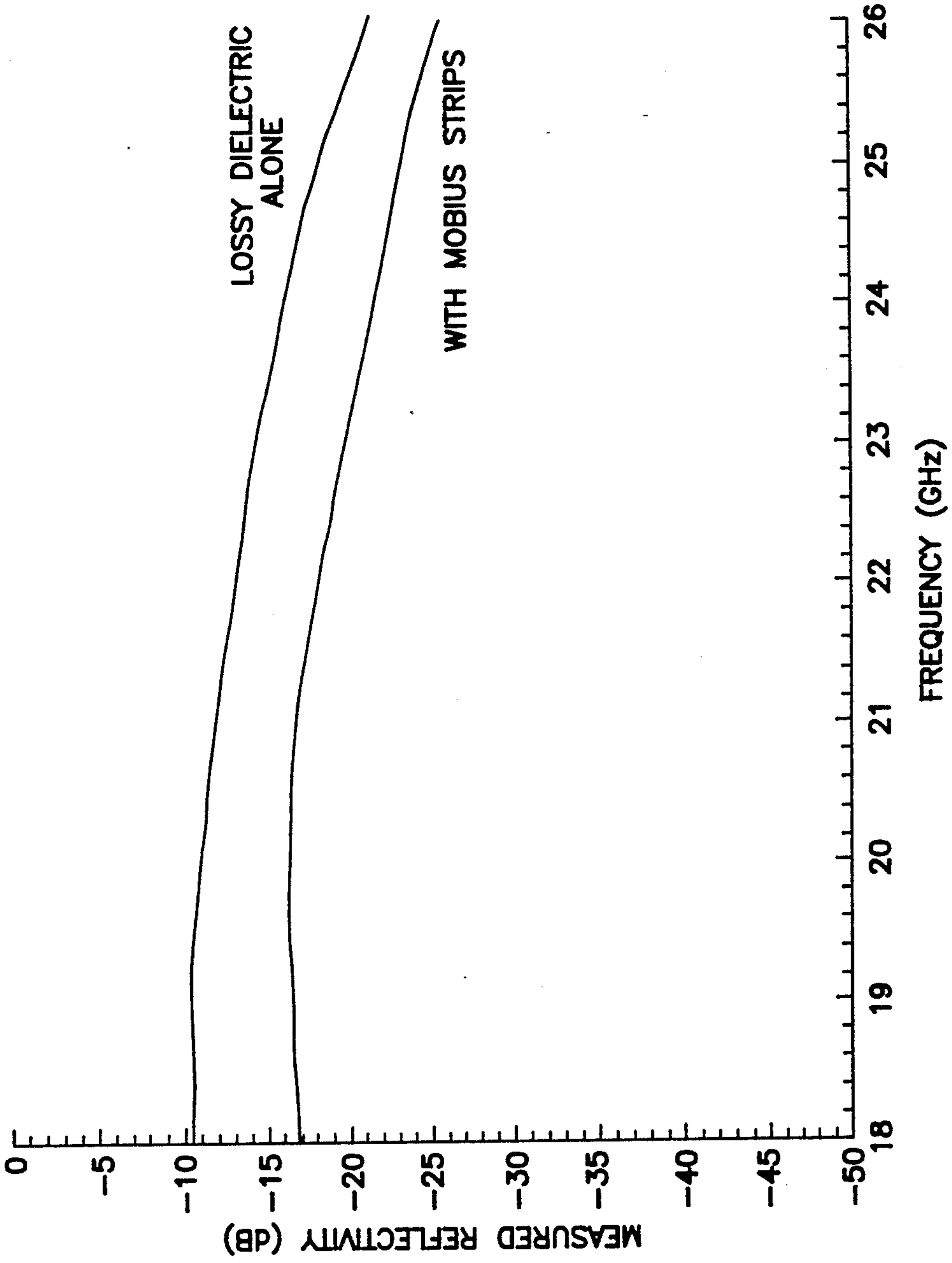

FIG. 9 shows the results of tests carried out on absorbers according to the invention in which the chiral elements are Möbius bands. The lossy dielectric medium was in this instance a lossy foam of 6.25 dB insertion loss at 3 GHz and the Möbius bands were formed of a carbon loaded polycarbonate foil ("Macrofol" available from Bayer). The Möbius bands are of 20 cm length and 5 mm wide. With a concentration of 36 rings on the 25 cm square test piece, an increase in reflection attenuation of approximately 7 dB can be achieved.

An alternative to the coil springs or möbius strips for the chiral elements include a) irregular tetrahedra, b) tapering coil springs (either with constant pitch and reducing diameter, or constant diameter or reducing pitch or a combination of both), c) screws, or d) forks with at least three prongs which form an asymmetrical non planar structure.

Such chiral elements, e.g. springs, need not be metallic but it is expected that they will be at least to some extent conductive, and may for example, be of copper, carbonyl iron, brass, steel, a ferromagnetic metal or alloy, ceramic, graphite or a conductive polymer (whether intrinsic or by addition).

While the present invention has been described with reference to its preferred embodiments, other modifications can achieve the same result. Variations and modifications and equivalents as fall within the true spirit and scope of this invention.

What we claim:

1. A structure for absorbing electromagnetic radiation in the range of frequencies from about 10 megahertz to about 100 gigahertz comprising:

a lossy dielectric medium; and chiral elements disposed outside the lossy dielectric medium.

2. The structure according to claim 1 wherein the chiral elements are in free space.

3. The structure according to claim 1 wherein the chiral elements are embedded in a non-lossy matrix.

4. The structure according to claim 3 wherein the non-lossy matrix is a polyurethane foam.

5. The structure according to claim 3 wherein the material of the lossy dielectric has an insertion loss which increases in the direction of travel of incident radiation.

6. The structure according to claim 5 comprising layers of material of successively increased insertion loss.

7. The structure according to claim 1 wherein the chiral elements are helices.

8. The structure according to claim 7 wherein the helices are resistive.

9. The structure according to claim 7 wherein the helices are metallic.

10. The structure according to claim 1 wherein the chiral elements are Mobius bands.

11. The structure according to claim 10 wherein the bands are formed of a resistive material.

12. A structure for absorbing electromagnetic radiation comprising:

a) a layer of lossy dielectric material;

b) one or more layers of non-lossy matrix adjacent to a surface of the lossy dielectric material; and c) chiral elements embedded in at least one of the one or more non-lossy layers.

13. The structure of claim 12 wherein the lossy dielectric layer is formed of a carbon black impregnated foam; the non-lossy matrix is a foam and the chiral elements are of a shape selected from the group consisting of helices, Mobius bands, irregular tetrahedra, tapered helices, screws, forks having an asymetrical non planar structure, and mixtures thereof.

14. The structure of claim 12 wherein the chiral elements are selected from the group consisting of copper, carbonyl iron, brass, steel, ferromagnetic metal, ferromagnetic metal alloy, ceramic, graphite or a conductive polymer.

15. The structure of claim 12 wherein the lossy dielectric material has an insertion loss which increases in the direction of travel of incident radiation.

16. The structure of claim 15 wherein the lossy material is formed of a series of layers, each of which has a successively increased insertion loss.

17. The structure of claim 12 wherein the chiral elements are selected from the group consisting of helices and Moebius bands.

* * * * *